United States Patent [19]

Bourdon

[11] Patent Number: 4,716,854
[45] Date of Patent: Jan. 5, 1988

[54] SEA AQUACULTURE INSTALLATION

[76] Inventor: André Bourdon, 65, rue Gambetta, 76200 Dieppe, France

[21] Appl. No.: 737,660

[22] Filed: May 24, 1985

[30] Foreign Application Priority Data

May 28, 1984 [FR] France ............................ 84 08319

[51] Int. Cl.⁴ .......................................... A01K 61/00
[52] U.S. Cl. ................................................. 119/3
[58] Field of Search ................... 119/2, 3, 4; 43/102, 43/103; 405/70, 71, 72; 56/8, 9, 13.6, 16.2

[56] References Cited

U.S. PATENT DOCUMENTS

| 3,521,387 | 7/1970 | Degalman | 56/9 |
| 3,893,283 | 7/1975 | Dandl | 56/13.6 |
| 4,063,748 | 12/1977 | Schmidt | 56/16.2 |
| 4,240,243 | 12/1980 | Deal | 56/8 |

FOREIGN PATENT DOCUMENTS

| 0080414 | 6/1983 | European Pat. Off. | 119/3 |
| 1590781 | 6/1981 | United Kingdom | 119/3 |
| 2078473 | 1/1982 | United Kingdom | 119/3 |

Primary Examiner—Paul J. Hirsch
Attorney, Agent, or Firm—Larson and Taylor

[57] ABSTRACT

An open sea aquaculture installation comprising a central structure similar to an offshore oil drilling platform and several floating modules which are anchored to the sea bed. The different modules are disposed at a distance, determined perpendicularly between lines each crossing a module and parallel to the mean direction of current in the surface layer of the sea, sufficient so that dejecta from the different modules do not interfere with adjacent modules.

14 Claims, 3 Drawing Figures

SEA AQUACULTURE INSTALLATION

The present invention relates to aquaculture installations in the presence of currents.

Aquaculture installations are already known placed in protected sites such as atolls or the furthermost ends of fjords. However, the drawback of these installations is their confinement for the water is only partially renewed and undergoes different processes of pollution. Thus, fish cause local pollution of the volume which contains them. This situation promotes the extension of illnesses to such an extent that the density of the fish must be limited. Furthermore, the confinement of the water reduces its oxygenation and the density of fish which may thus be raised is thus also limited.

Attempts have been made to overcome these drawbacks out at sea. Floating cages anchored to the sea bed have already been used. They operate satisfactorily in protected sites such as bays or coves but they cannot withstand the conditions reigning out at sea. They are therefore only used with moderate fish densities, taking into account the pollution proper to the fish themselves.

It has also been suggested to provide platforms similar to those which are used for drilling at sea with breeding cages which are connected thereto. These installations give satisfaction when the current conditions are well adapted, that is to say when the currents are sufficiently strong to renew the water and disperse the dejecta or when the currents are quite non existent and allow the dejecta to fall directly to the bottom of the sea.

It has however been discovered that, in seas whose currents have an average intensity, problems of pollution, particularly internal pollution, could occur.

The invention concerns an aquaculture installation in the open sea which does not present the above disadvantages, essentially that of internal pollution.

More precisely, it concerns such an installation which comprises at least two submersible floating modules. The modules are staggered with respect to each other in a direction perpendicular to the mean direction of the currents of the surface layer of the sea, by a distance sufficient so that the zones of action of the two modules do not practically overlap. In the present description, the expression "zone of action" designates the region of the sea which is affected by the pollution due to the fish bred in the modules. Thus, these zones of action have a great length parallel to the mean direction of the currents and a certain extent transversely to this mean direction.

For example, when two modules are placed side by side the distance which separates them, in the direction perpendicular to the mean direction of the currents, is at least equal to the sum of the half widths of the zones of action of the two modules. For example, when the modules have a minimum dimension of 20 m in all directions parallel to the surface of the sea, a distance of the order of a 100 m and at least equal to 40 m is advantageous.

Each module is advantageously formed from a rigid framework intended to float and whose minimum dimension is 20 m in all directions parallel to the surface of the sea, carrying breeding cages which are fixed thereto, devices providing anchorage for the framework.

In one example of installation, several modules, for example six, are disposed in a line substantially perpendicular to the mean direction of the currents and a central structure is associated with the whole of the installation. The central structure is connected to the different modules by flexible submerged piping intended for conveying the food for the fish, for transmitting the energy required for operating different devices placed on the modules, etc.

Other characteristics and advantages of the invention will be clearer from the following description with reference to the accompanying drawings in which.

Figure 1:
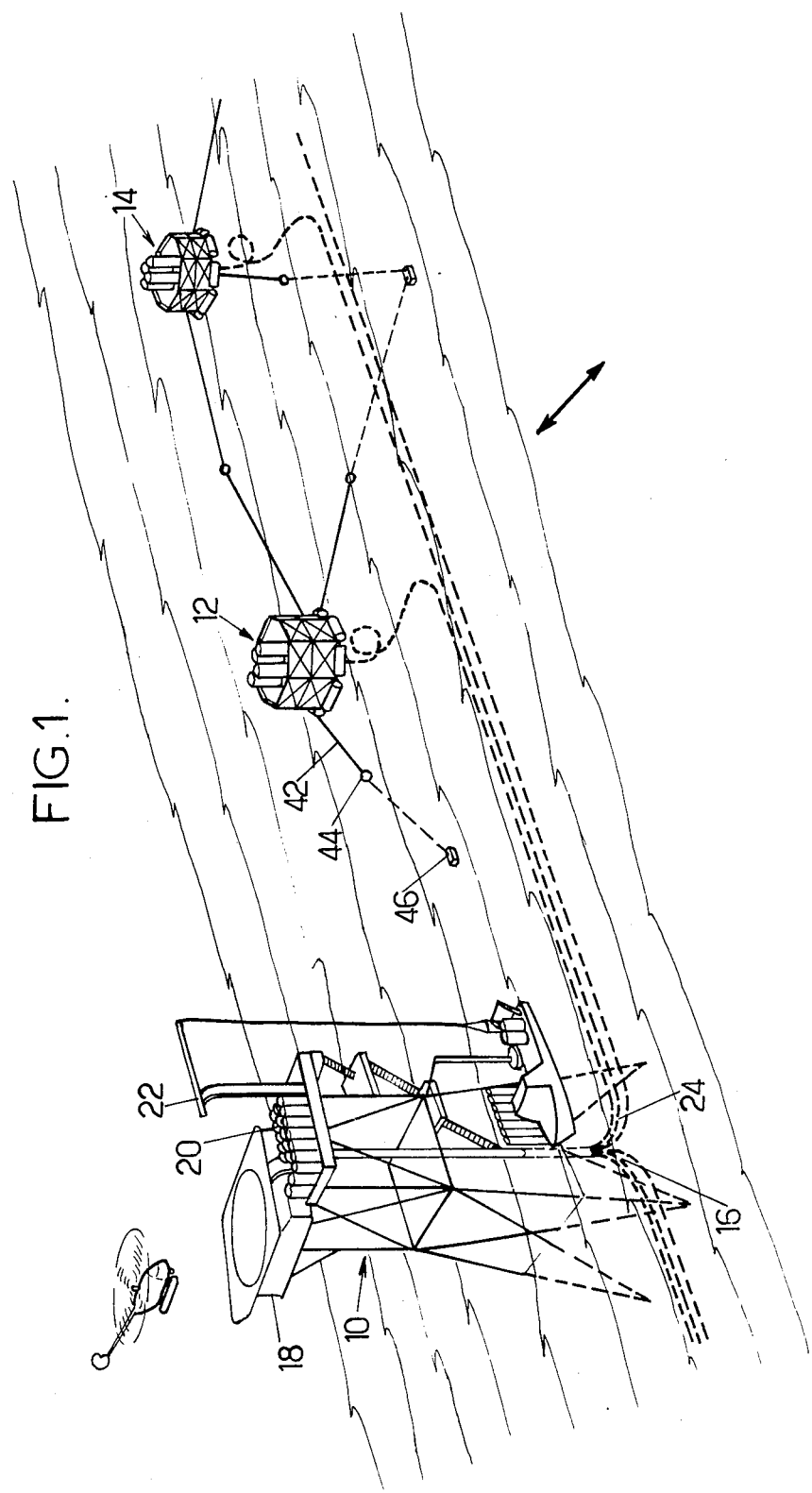
FIG. 1 is a schematical perspective view showing a part of an installation comprising a central structure and several modules only two of which have been shown.

FIG. 1 shows a part of an aquaculture installation in accordance with the invention. The installation comprises a central structure 10 and several breeding modules two of which are shown by the references 12 and 14.

The central structure comprises a fixed assembly resting on the sea bed and fixed to piles driven into the sea bed. The structure is shown in the form of a column 16 formed by beams and having great rigidity. This column is manufactured in accordance with the techniques well known to specialists in oil platforms. The column comprises a deck 18 which itself supports all the installations 20 required for the installation. Deck 18 is supported at a sufficiently great height above the level of the highest sea so that even in the event of a high storm the platform is not affected by the weight.

One of the faces of column 16 comprises fenders for ships coming alongside with supplies.

The different devices carried by the deck comprise containers of a few cubic meters for storing the food for the fish in the form of pellets. These foods may be of different types, for example to be moistened before use. A fresh water reserve, a fuel reserve and a compressed air reservoir are also placed on the deck.

A small generating plant comprising generating sets provides the power supply for the different equipment of the central structure and for the modules which must receive electric current. In addition, the installation comprises a pumping station for feeding all the fluids to the different modules. For example, the foods received by the central structure, from a ship unloaded by means of a crane 22, are prepared in the central structure then fed through pipes such as 24 to the different modules in the presence of a fluid vehicle which may be water or air.

The central structure will not be described in greater detail since the different functions which it fulfils and its construction are already known, separately.

Figure 2:
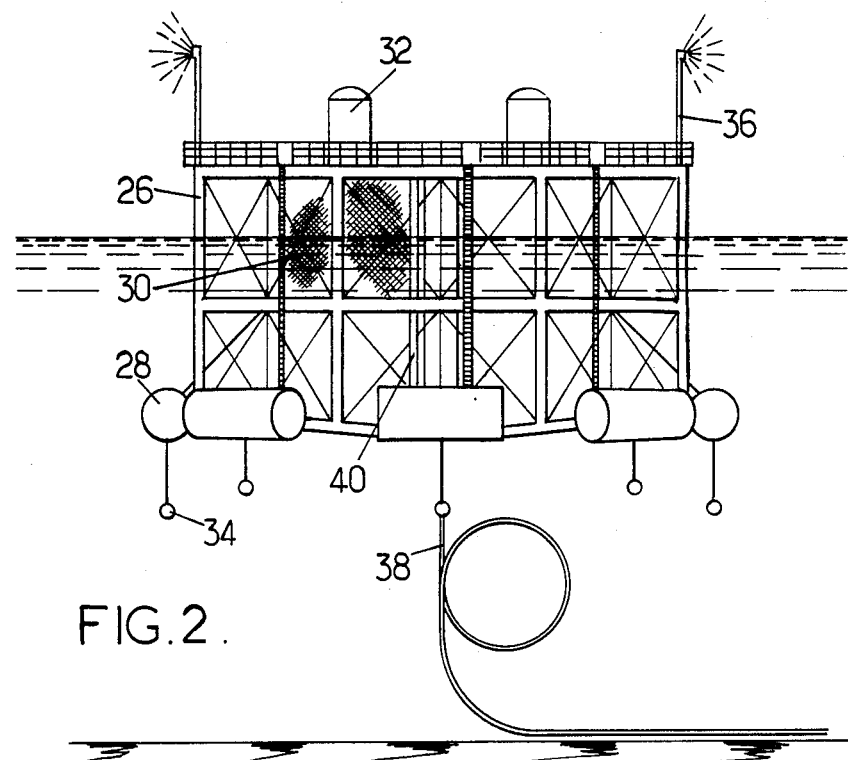
FIG. 2 is an elevational view of a breeding module of the installation shown in FIG. 3.
Figure 3:
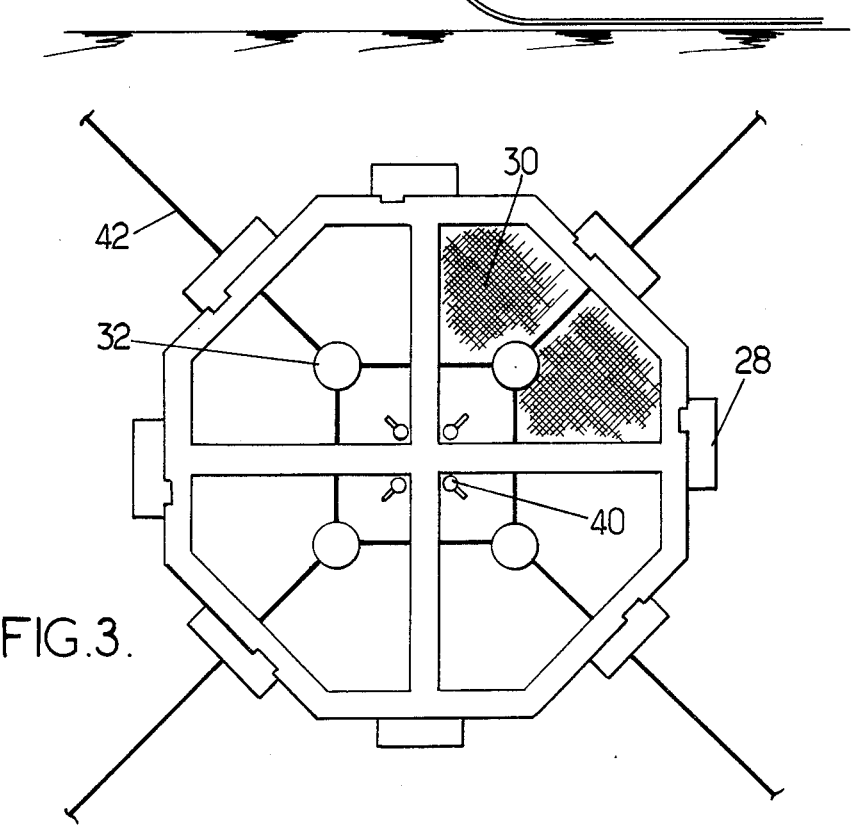
FIG. 3 is a top view of the module of FIG. 2.

FIGS. 2 and 3 show in greater detail one example of a breeding module. This module comprises a rigid framework 22 whose smallest dimension, seen from the top such as shown in FIG. 3, is at least equal to 20 m. These dimensions allow the structure to withstand the harshest sea. The lower part of the structure comprises reservoirs 28 which are normally filled with air when the structure floats on the surface but which may be filled with water when the module is to be immersed, as described hereafter in the description.

Trelliswork 30 defines breeding cages inside the framework. These cages are supplied by means of distributors 32 placed above each cage and allowing good distribution of the foods throughout the whole volume of each cage.

Reference 34 designates masses suspended at different heights below the structure and whose purpose is to prevent the shock of the framework against the bottom of the sea. In fact, these masses, as soon as they rest on the sea bed, reduce the immersion force exerted on the framework and thus prevent shocks which might be harmful.

Each module further comprises a beaconing system 36 and is supplied through one or more immersed pipes 38 which are flexible and which are normally buried in a trench. Television cameras 40 which may be immersed allow the dimension of the fish and more generally the different conditions in the cages to be observed and surveyed.

It should be noted that all the breeding modules may be immersed to a few meters or a few tens of meters below the surface of the sea. Consequently, all the apparatus must be able to withstand such an immersion. As shown in FIG. 1, each module is retained by anchorage lines 42 connected by means of anti-pounding devices 44 to anchor buoys 46.

The modules shown have a squat shape giving them high mechanical strength. They are disposed in a line substantially perpendicular to the mean direction of the currents. This arrangement of the different modules allows the dejecta of the fish to be removed by the currents without interference from one module to another. The modules are very accessible by boat and for this they comprise all the fenders and tying up devices required as well as the ladders and footbridges shown in FIG. 2, providing convenient access.

The use of anchor buoys common to two modules avoids any risk of collision between the modules. They behave independently in the presence of swell, currents, waves and winds.

The connection between the central structure and the modules is provided by immersed pipes shown by the reference 24 in FIG. 1. They may lie on the bottom but are preferably placed in a trench. They comprise advantageously piping and cables grouped together inside a duct having for example a diameter of 120 mm, the duct providing retention and protection. The duct formed is semirigid and it contains for example four food transfer pipes, four information transmission cables for the television cameras, an electric supply cable and a compressed air supply cable.

The food may be transferred for example in the presence of sea water which forms the vehicle. The arrival of the food in the form of a stream of water at a certain pressure allows automatic operation of the distributors 32 of the different modules.

The working of the above described installation will now be considered more precisely. The different cages receive young fish coming from fish breeders, transported in tanks which are emptied into the different cages. The transfer between the tanks and the cages may be made directly by gravity or by means of a pick up pump of known type.

The food is distributed for example twice per day, from one or more types of foods. The preparation is made in the central module which comprises weighing and quantity determination installations with possibly hydration of the pellets. The foods are prepared temporarily for transmission to the cage considered. The food is prepared depending on the size of the fish in the particular cage, on the transformation rate of the foods, on the climatic conditions, on the fish density, etc, all these parameters being taken into account by a computer placed on the central structure. This preparation may also be carried out with respect to measurements made relating more particularly to the nature of the currents and of the winds, the temperature of the water and its muddiness, the dissolved oxygen concentration and the salinity of the water, its Ph, the presence of possible polluting materials such as hydrocarbons etc. When fish are to be retrieved from the cage, the operation is advantageously carried out by suction. In this case, the service boat comes alongside the module considered and introduces a flexible pipe which is connected to the bottom of the cage considered.

Each cage advantageously comprises a mobile ceiling formed from a trelliswork which is lowered during pumping so that the fish are close to the suction point.

The modules normally float on the surface of the water. However, some conditions may require their immersion. For example, when the sea becomes extremely rough, it may be advantageous to move the fish away from the surface of the sea and to immerse the cages, for example at a distance of 10 m or so below the surface. For this, reservoirs 28 are used as ballasts. They may be filled more or less rapidly so that each module may be immersed very rapidly in the case of an emergency and less rapidly in the opposite case. For this, electromagnetic valves allow water to enter into the ballast 28 and the air which they contain to be discharged so that the immersion speed is of the order of 0.5 to 1 m per minute normally. In an emergency, this speed may reach 5 m per minute. The shock against the bottom of the sea is avoided by the suspended masses 34 (FIG. 2).

Although it has not been mentioned above, the installation comprises the necessary safety devices, such as regulation beacons and protection by radar monitoring, allowing automatic immersion of the modules in the case of danger, for example on the arrival of a boat likely to steal a part of the fish.

Thus, an installation has been described in which the central structure is used simply for carrying out the different operations required for working without staff residing in the installation, the control being provided remotely from a land infrastructure., This infrastructure is intended to provide handling of the goods required for operating the installation, with possible storage, and it ensures conveyance of the supplies to the central structure.

Although an installation has been described relatively close to land and whose central module is fixed directly to the bottom of the sea, these characteristics are only contingent. In fact, when the depth is great, the central structure may itself be anchored and may float. Furthermore, independently of the nature of the central structure, the installation may be self contained, that is to say that all the functions are provided from the central structure which must then provide lodging for the staff. The only essential feature of the invention is that the zones of action of the different modules, i.e. the regions likely to be polluted by the dejecta coming from one module, do not overlap laterally. This characteristic is obtained by sufficient spacing of the modules, transversely to the direction of the mean currents in the surface layer of the sea, that is to say the upper layer of a few tens of meters in thickness.

I claim:
1. An aquaculture installation comprising:
   a plurality of cage modules, each having a framework sufficiently strong to withstand open sea currents, each module having an open cage structure over at least a portion of its surface area, and each cage having a weight and air reservoir structure which causes the module to float in an open sea environment with at least a lower portion of its cage structure submerged below the surface, said plurality of modules being located in an open sea having currents in surface layers, which currents are essentially unconfined by sea boundry structures, each module containing therein the fish life which creates fish pollution, primarily fish dejecta, which is carried away by the said currents in the surface layer, the pollution carried away by the said currents being located in a zone of action, which zone extends substantially parallel to and in the direction of said current from each cage, downstream therefrom, and a certain width transverse to the direction of said currents, the modules of the plurality thereof being spaced apart in a direction transverse to the mean direction of said currents a sufficient distance that the zones of action of two adjacent modules are free from overlap with each other.

2. An installation according to claim 1, wherein the said distance between adjacent modules, taken in said transverse direction, is equal to the sum of one half of the width of each of the two zones of action of those two respective adjacent modules.

3. An installation according to claim 1, wherein each module is made of rigid framework and has an open water permeable cage structure connected to the rigid framework.

4. An installation according to claim 1, wherein each module has a minimum dimension of 20 meters in all directions taken in a horizontal plane.

5. An installation according to claim 4, wherein the said distance between adjacent modules in said transverse direction is at least 40 meters.

6. An installation according to claim 1, wherein said installation further includes a central structure, and including means for supplying materials from said central structure to all of said modules.

7. An installation according to claim 6, including means for controlling the central structure from a remote land infrastructure.

8. An installation according to claim 6, wherein the central structure is self-contained.

9. An installation according to claim 6, wherein said means for supplying materials comprises immersed pipes for transporting fluid and energy.

10. An installation according to claim 1, including immersed pipes disposed between each module and a land infrastructure.

11. A method of breeding fish, comprising:
arranging a plurality of cage modules in an open sea having currents in surface layers, which currents are essentially unconfined by sea boundries, and wherein each module (1) is sufficiently strong to withstand open sea currents, (2) has an open cage structure over a portion of its surface area to permit water, but not sea life, to pass therethrough and (3) has a weight and air reservoir structure which causes it to float in an open sea environment with at least a portion of its cage structure submerged below the surface, placing into each of said cage modules the fish life to be bred, wherein said fish life creates pollution, primarily fish dejecta, which is carried away by the said currents in the surface layer, the pollution carried away by the said currents being located in a zone of action, which zone extends substantially parallel to and in the direction of said current, and arranging adjacent modules spaced apart from each other in a direction transverse to the mean direction of said currents a sufficient distance that the zones of action of two adjacent modules are free from overlap with each other.

12. The method of claim 11, wherein the arrangement of the modules includes spacing apart adjacent modules in said transverse direction by an amount equal to the sum of one half of the width of each of the zones of action of those two adjacent modules.

13. The method of claim 11, wherein each module has a minimum horizontal dimension of 11 meters and the step of arranging adjacent modules comprises arranging them at least 40 meters apart.

14. The method according to claim 11, including supplying materials to the modules from a common central structure.

* * * * *